(12) United States Patent
Tsuji

(10) Patent No.: US 8,411,373 B2
(45) Date of Patent: Apr. 2, 2013

(54) ZOOM LENS BARREL CAPABLE OF RETRACTING INTO LENS BARREL BODY

(75) Inventor: Kanji Tsuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/209,981

(22) Filed: Aug. 15, 2011

(65) Prior Publication Data

US 2012/0044581 A1 Feb. 23, 2012

(30) Foreign Application Priority Data

Aug. 19, 2010 (JP) .................................. 2010-184054

(51) Int. Cl.
*G02B 15/14* (2006.01)
*G02B 7/02* (2006.01)
(52) U.S. Cl. ......................... 359/704; 359/811; 359/819
(58) Field of Classification Search .......... 359/694–704, 359/811–830
See application file for complete search history.

(56) References Cited

U.S. PATENT DOCUMENTS

| 2010/0172032 A1* | 7/2010 | Fukino ........................... 359/700 |
| 2010/0328785 A1* | 12/2010 | Nomura ......................... 359/699 |
| 2012/0044579 A1* | 2/2012 | Tsuji et al. .................... 359/700 |
| 2012/0200941 A1* | 8/2012 | Kudoh .......................... 359/699 |

FOREIGN PATENT DOCUMENTS

| JP | 2007-206716 | 8/2007 |
| JP | 4329834 | 9/2009 |

* cited by examiner

*Primary Examiner* — Mohammed Hasan
(74) *Attorney, Agent, or Firm* — Cowan, Liebowitz & Latman, P.C.

(57) ABSTRACT

A zoom lens barrel includes a first optical element 300, 400 and a second optical element 600, a first guide member 703 configured to linearly guide the first optical element 300, 400 in an optical axis direction, a second guide member 704 configured to linearly guide the second optical element 600 in the optical axis direction, and a linear cylinder 700 including an opening portion configured to be able to integrate the first optical element and the second optical element only in the optical axis direction, a first holding portion 700g, 700h that supports both ends of the first guide member, and a second holding portion 700i, 700j that supports both ends of the second guide member.

5 Claims, 16 Drawing Sheets

ZOOM LENS BARREL CAPABLE OF RETRACTING INTO LENS BARREL BODY

BACKGROUND OF THE INVENTION

1. Field of the Invention

The present invention relates to a zoom lens barrel capable of extending in an optical axis direction to perform zoom operation and capable of retracting into a lens barrel body.

2. Description of the Related Art

Previously, there has been a zoom lens barrel that is provided with a guide shaft parallel to an optical axis and that fits a holding member holding a lens unit into the guide shaft slidably. Japanese Patent No. 4329834 discloses a zoom lens barrel that is provided with a front barrel, an intermediate barrel, and a rear barrel and that includes a Z-guide shaft and an F-guide shaft that guide a Z-moving frame and an F-moving frame in an optical axis direction, respectively. The zoom lens barrel that is disclosed in Japanese Patent No. 4329834 has a configuration in which both ends of the Z-guide shaft and the F-guide shaft are fixed and supported by the intermediate barrel and the front barrel, and the intermediate barrel and the rear barrel, respectively.

However, the zoom lens barrel disclosed in Japanese Patent No. 4329834 is configured so that both the ends of the guide shaft are fixed and supported using members separated from each other. Therefore, due to the variation of the processing accuracy of both the members that support the guide shaft, it is difficult to set the guide shaft to be parallel to the optical axis, and therefore each lens unit may be inclined with respect to the optical axis to deteriorate an optical performance.

SUMMARY OF THE INVENTION

The present invention provides a zoom lens barrel that improves inclination accuracy of a guide shaft with respect to an optical axis to suppress the inclination of a lens unit to improve an optical performance.

A zoom lens barrel as one aspect of the present invention includes a first optical element, a second optical element, a first guide member configured to linearly guide the first optical element in an optical axis direction, a second guide member configured to linearly guide the second optical element in the optical axis direction, and a linear cylinder including an opening portion configured to be able to integrate the first optical element and the second optical element only in the optical axis direction, a first holding portion that supports both ends of the first guide member, and a second holding portion that supports both ends of the second guide member.

Further features and aspects of the present invention will become apparent from the following description of exemplary embodiments with reference to the attached drawings.

DESCRIPTION OF THE PREFERRED EMBODIMENTS

Figure 1:
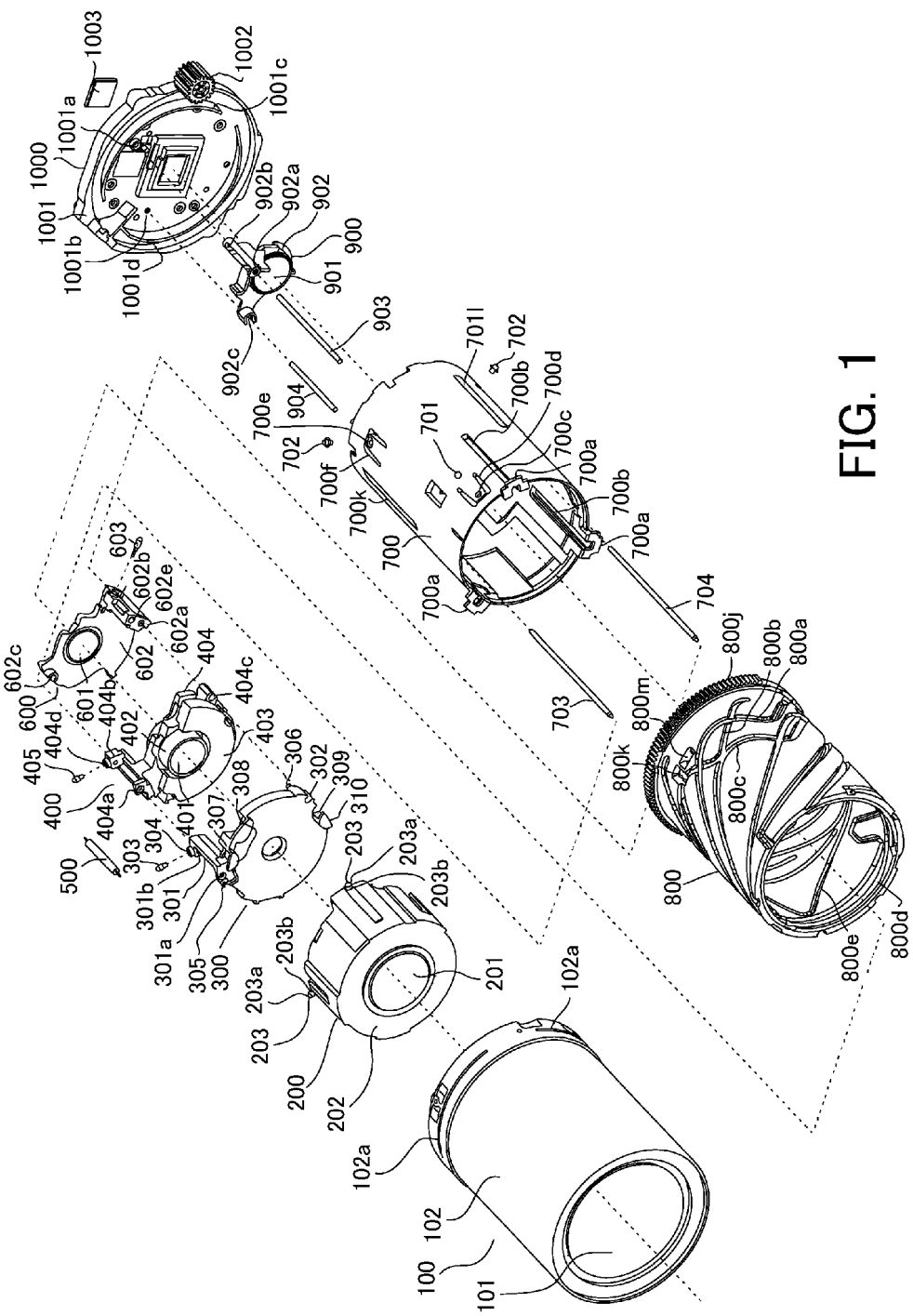
FIG. 1 is an exploded perspective view illustrating an overall structure of a zoom lens barrel in the present embodiment.

Exemplary embodiments of the present invention will be described below with reference to the accompanied drawings. In each of the drawings, the same elements will be denoted by the same reference numerals and the duplicate descriptions thereof will be omitted.

Figure 2:
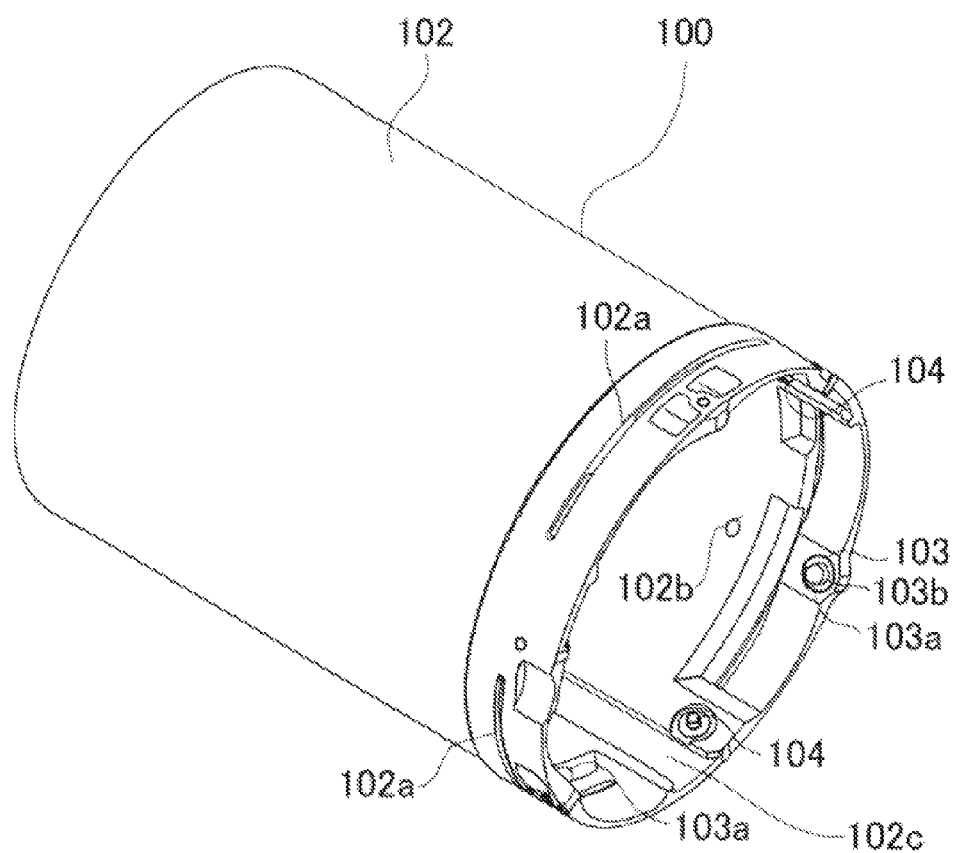
FIG. 2 is a perspective view illustrating a first unit in the present embodiment.
Figure 3A:
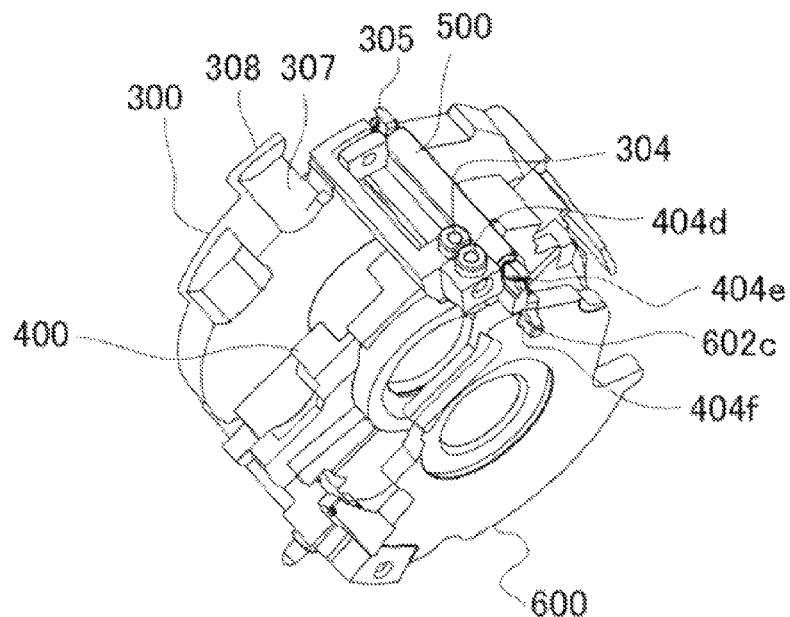
FIG. 3A is a perspective view illustrating an integration unit that is configured by stacking a stop/shutter unit, a third unit, and a fourth unit in the present embodiment.
Figure 3B:
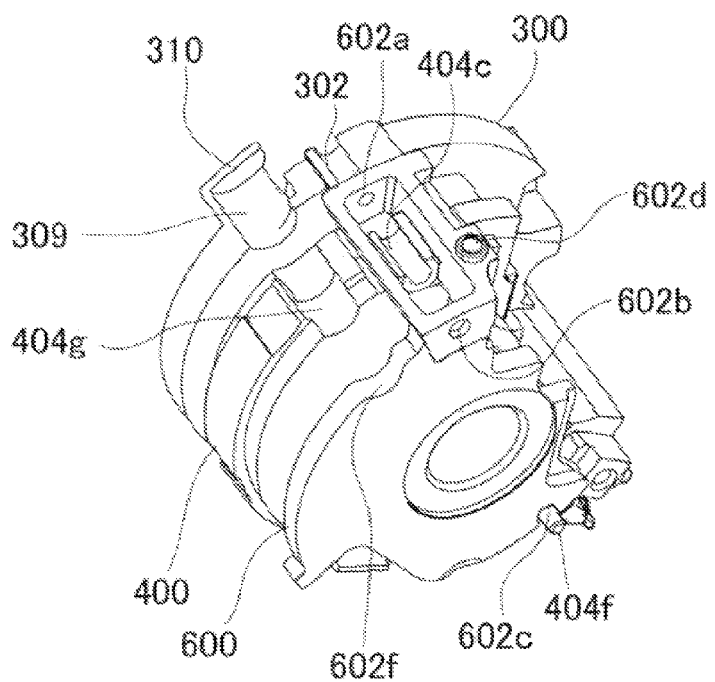
FIG. 3B is a perspective view illustrating an integration unit that is configured by stacking a stop/shutter unit, a third unit, and a fourth unit in the present embodiment.
Figure 4:
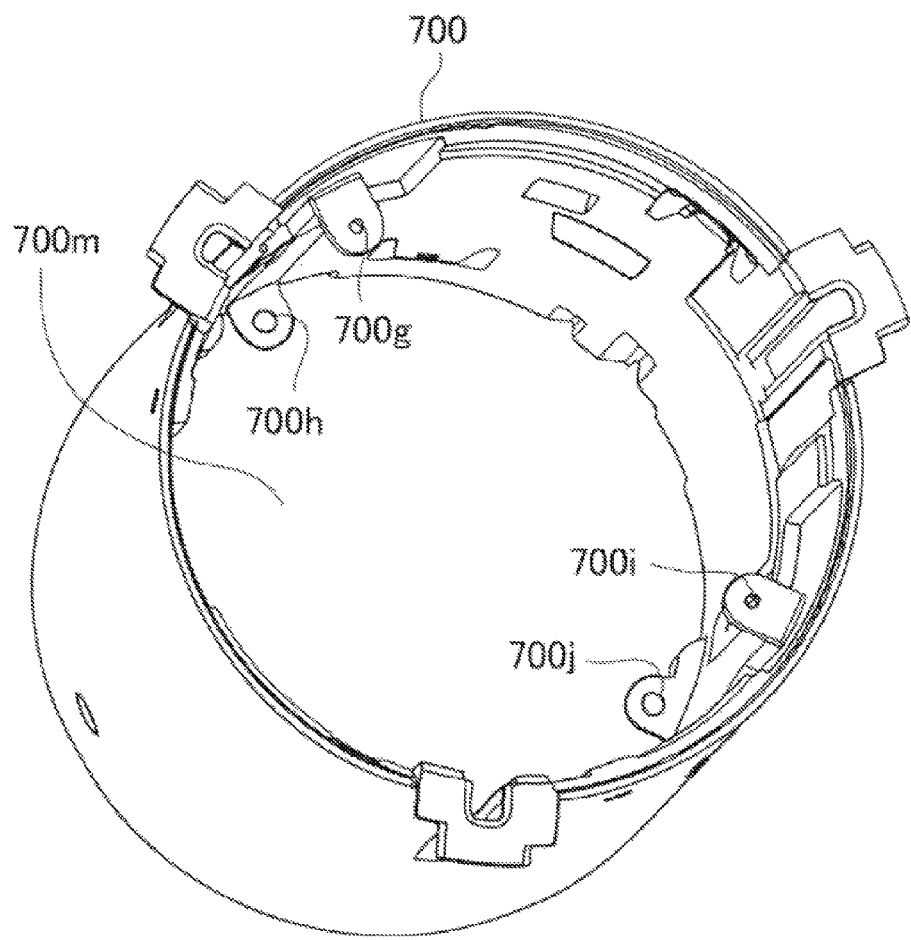
FIG. 4 is a perspective view illustrating a linear cylinder in the present embodiment.
Figure 5A:
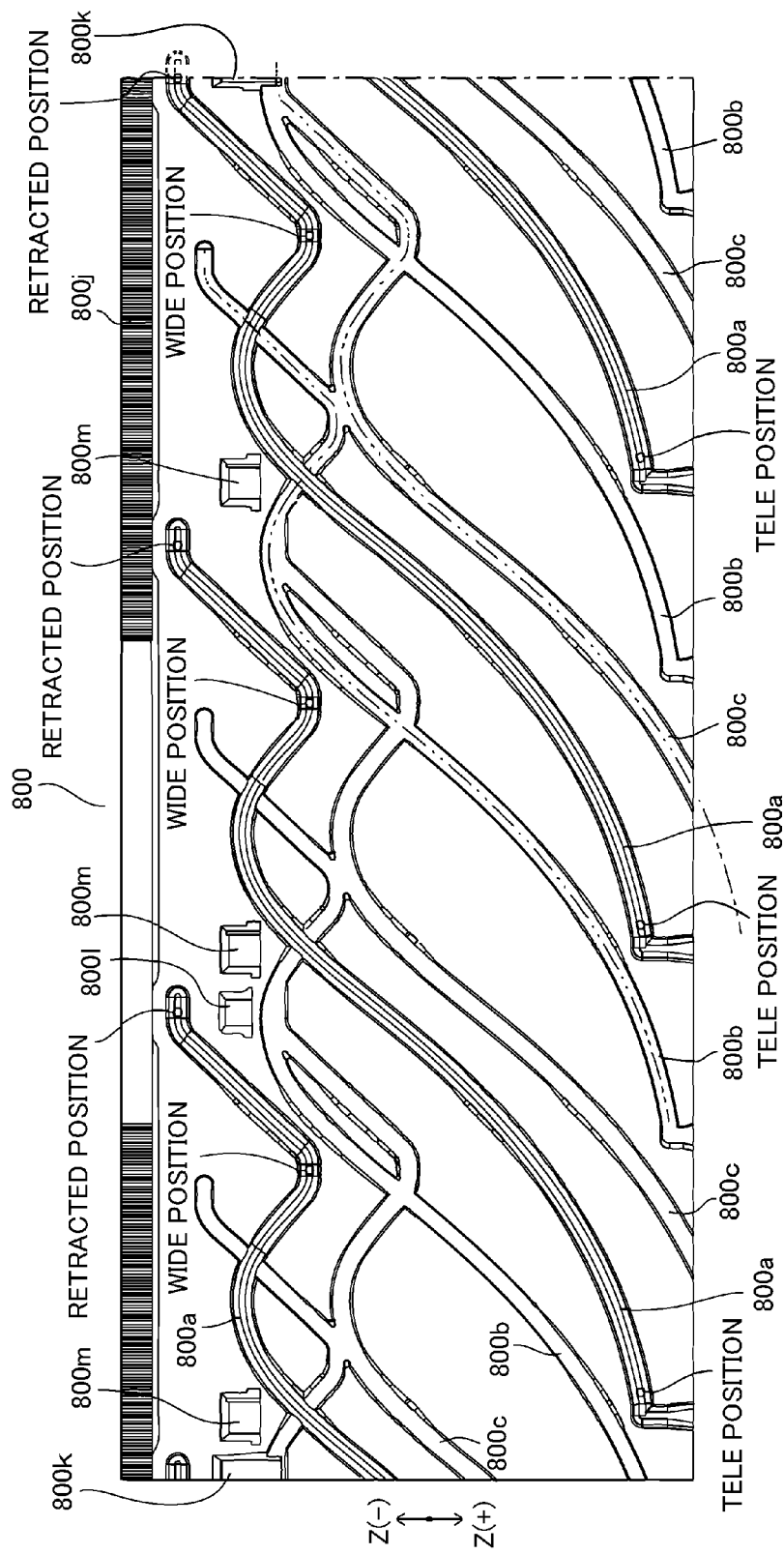
FIG. 5A is a development view of an outer surface of a cam cylinder in the present embodiment.
Figure 5B:
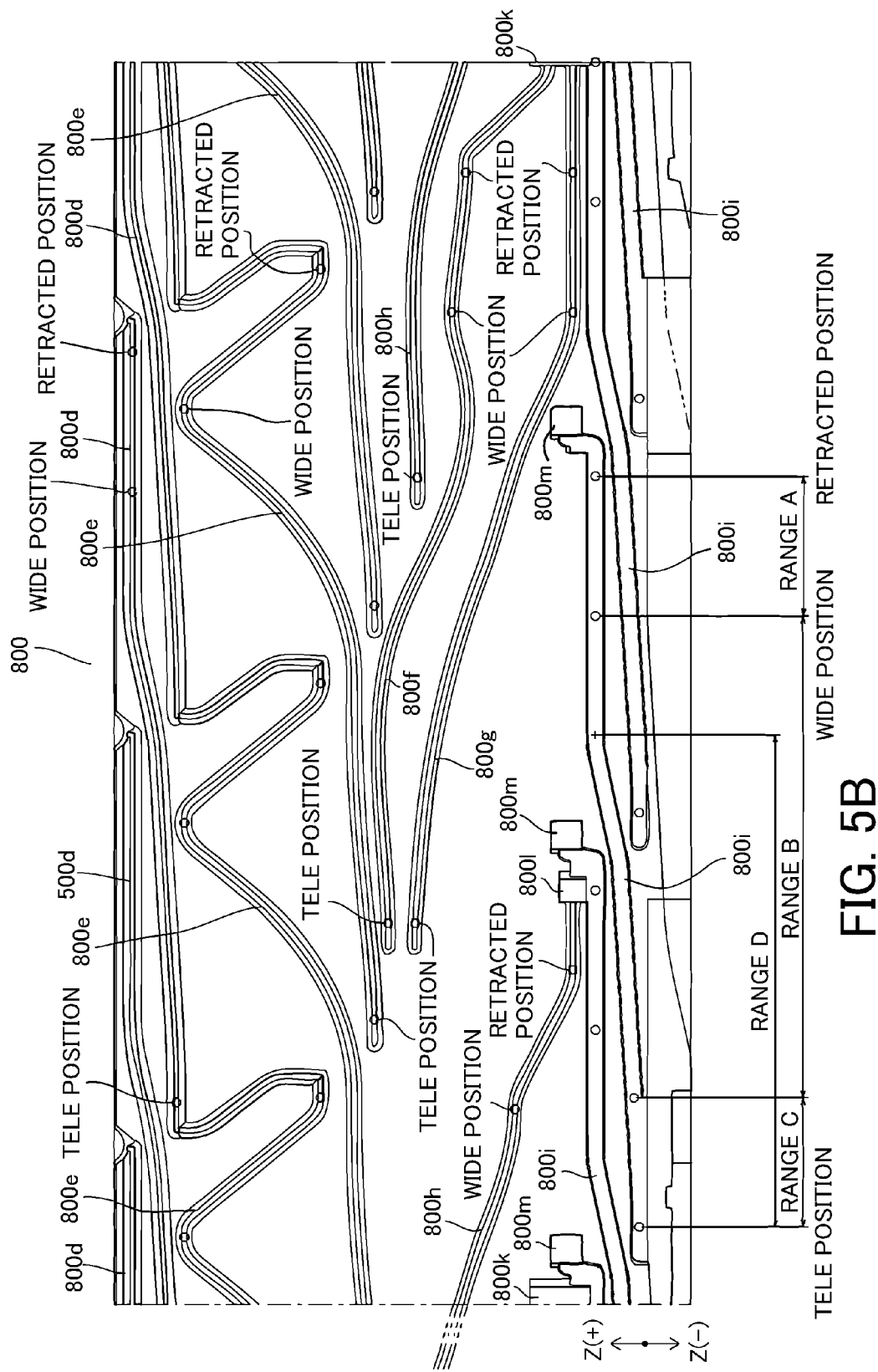
FIG. 5B is a development view of an inner surface of a cam cylinder in the present embodiment.
Figure 6:
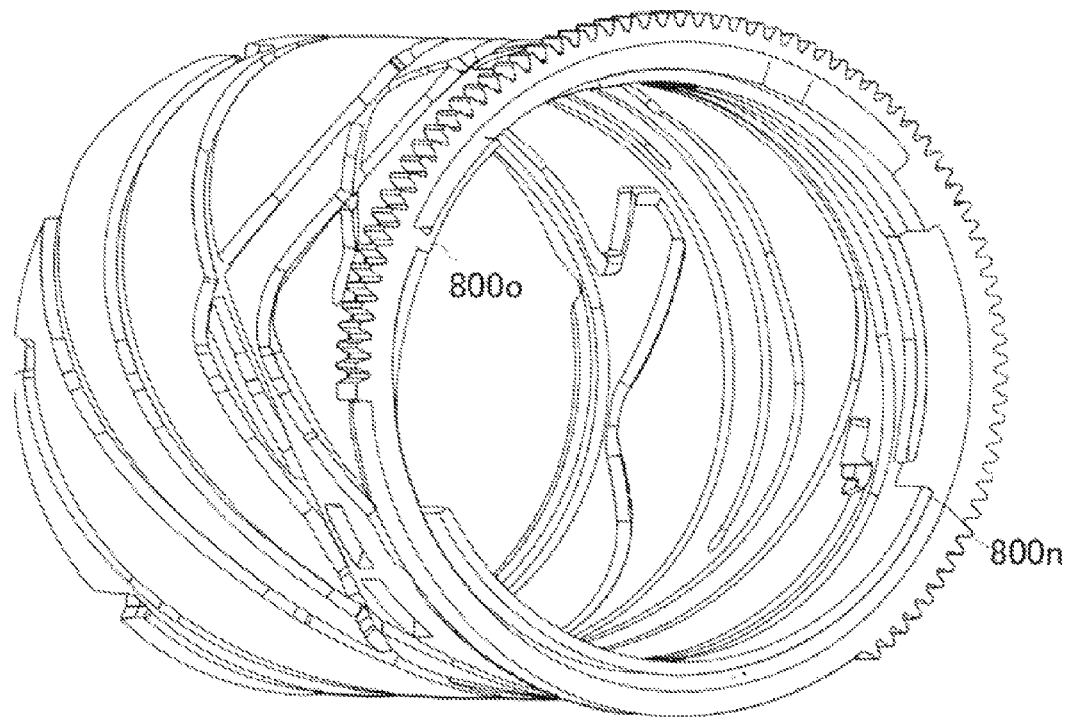
FIG. 6 is a perspective view illustrating a cam cylinder in the present embodiment.

First of all, a configuration of a zoom lens barrel in the present embodiment will be described. FIG. 1 is an exploded perspective view illustrating an overall structure of the zoom lens barrel. FIG. 2 is a perspective view illustrating a first unit. FIGS. 3A and 3B are perspective views illustrating an integration unit that is configured by stacking a stop/shutter unit, a third unit, and a fourth unit. FIG. 4 is a perspective view illustrating a linear cylinder. FIGS. 5A and 5B are development views of an outer surface and an inner surface of a cam cylinder, respectively. FIG. 6 is a perspective view illustrating the cam cylinder.

In FIGS. 1 and 2, reference numeral 100 denotes a first unit. Reference numeral 101 denotes a first lens unit, and reference numeral 102 denotes a first unit cylinder that holds the first lens unit 101. The first unit cylinder 102 is provided with slit holes 102a at three regions in a circumferential direction, a convex portion 102b in an inner circumferential surface, and groove portions 102c at three regions in the circumferential direction. Reference numeral 103 denotes a cam pin, which has a spherical R-shaped portion 103a and a taper shape portion 103b and is fixed on the first unit cylinder 102 at three regions in the circumferential direction. Reference numeral 104 denotes a pin member, which is fixed on the first unit cylinder 102 at three regions in the circumferential direction.

In FIG. 1, reference numeral 200 denotes a second unit. Reference numeral 201 denotes a second lens unit, and reference numeral 202 denotes a second unit cylinder. The second unit cylinder 202 is provided with cam pins 203 at three regions in the circumferential direction. The cam pin 203 includes a taper portion 203a and a cylinder portion 203b.

In FIGS. 1, 3A, and 3B, reference numeral 300 denotes a stop/shutter unit (a first optical element). The stop/shutter unit 300 is provided with a main guide portion 301, and main guide holes 301a and 301b are formed in the main guide portion 301. The stop/shutter unit 300 is also provided with a sub-guide portion 302, a cam pin 303, a hole portion 304 into which the cam pin 303 can be fitted, and a hook portion 305. Furthermore, the stop/shutter unit 300 is provided with a shaft portion 306, notch portions 307 and 309, and convex-shaped portions 308 and 310.

Reference numeral 400 denotes a third unit (the first optical element). Reference numeral 401 denotes a third lens unit, reference numeral 402 denotes a third lens unit holding member, and reference numeral 403 denotes a well-known driving unit that drives the third lens unit holding member 402 in a direction orthogonal to the optical axis. Reference numeral 404 denotes a third unit base member that holds the third lens unit holding member 402 and the driving unit 403. The third unit base member 404 is provided with main guide holes 404a and 404b, a sub-guide portion 404c, and a cam pin insertion hole 404d. The third unit base member 404 is also provided with a hook portion 404e, a guide portion 404f, and a notch portion 404g. Reference numeral 405 denotes a cam pin, which is inserted into the cam pin insertion portion 404d. Reference numeral 500 denotes a spring member, which is hooked on the hook portion 305 of the stop/shutter unit 300 and the hook portion 404e of the third unit 400.

Reference numeral 600 denotes a fourth unit (a second optical element). Reference numeral 601 denotes a fourth lens unit, and reference numeral 602 denotes a fourth lens unit holding member, which holds the fourth lens unit 601. The fourth lens unit holding member 602 is provided with main guide holes 602a and 602b, sub-guide portion 602c that engages with the guide portion 404f, and a cam pin insertion hole 602d. The fourth lens unit holding member 602 is also provided with a positioning hole 602e and a notch portion 602f. Reference numeral 603 denotes a cam pin, which is inserted into the cam pin insertion hole 602d.

In FIGS. 1 and 4, reference numeral 700 denotes a linear cylinder. The linear cylinder 700 is fixed on a base member 1001 described below. The linear cylinder 700 is provided with convex portions 700a that engage with the groove portions 102c of the first unit cylinder 102 at three regions and groove portions 700b that engage with the cylinder portions 203b of the second unit cylinder 202 at three regions. The linear cylinder 700 is also provided with concave portions 700c at three regions in the circumferential direction and a notch 700d at one region. Similarly, the linear cylinder 700 is provided with hole portions 700e at three regions in the circumferential direction and a notch 700f at one region. Furthermore, it is provided with guide shaft holding portions (700g, 700h) and (700i, 700j) each of which has a through hole. Additionally, a hole portion 700k that integrates the cam pins 303 and 405 and a hole portion 700l that integrates the cam pin 603 are formed.

Reference numeral 701 denotes a ball member (a first cam follower) that is provided on the linear cylinder 700, which is fitted into the concave portion 700c. The ball member 701 is configured so as to be rotatable with respect to a cam groove 800d described below. Reference numeral 702 denotes a pin member (a second cam follower) that is provided on the linear cylinder 700, which is fitted into the hole portions 700e at three regions. The end of the pin member 702 has a spherical R shape. The pin member 702 is configured so as to be elastically engageable with a cam groove 800i described below in a radial direction of a cam cylinder 800.

Reference numeral 703 denotes a guide shaft member (a first guide member), which is fitted into the main guide holes 301a and 301b of the stop/shutter unit 300 and the main guide holes 404a and 404b of the third unit base member 404 and is held by the guide shaft holding portions 700g and 700h. The guide shaft holding portions 700g and 700h are a first holding portion that supports both ends of the guide shaft member 703. The guide shaft member 703 linearly guides the first optical element (the stop/shutter unit 300 and the third unit 400) in the optical axis direction. Reference numeral 704 denotes a guide shaft member (a second guide member). The guide shaft member 704 is fitted into the sub-guide portion 302 of the stop/shutter unit 300, the sub-guide portion 404c of the third unit base member 404, and the main guide holes 602a and 602b of the fourth lens unit holding member 602, and is held by the guide shaft holding portions 700i and 700j. The rotation of the first optical element around the optical axis is limited by the guide shaft member 704. The guide shaft holding portions 700i and 700j are a second holding portion that supports both ends of the guide shaft member 704. The guide shaft member 704 linearly guides the second optical element (the fourth unit 600) in the optical axis direction. The linear cylinder 700 has an opening portion 700m configured to be able to integrate the first optical element and the second optical element only in the optical axis direction.

In FIGS. 1, 5A, and 5B, reference numeral 800 denotes a cam cylinder. The cam cylinder 800 is configured so as to be rotatable with respect to the linear cylinder 700. At the outer circumferential side of the cam cylinder 800, a cam groove 800a that the spherical R-shaped portion 103a of the cam pin 103 contacts, a cam groove 800b that corresponds to the pin member 104, and the cam groove 800c that corresponds to the convex portion 102b are formed. The cam grooves 800a, 800b, and 800c have the same trajectory, and predetermined gaps are provided between the pin member 104 and the cam groove 800b and between the convex portion 102b and the cam groove 800c respectively.

On an inner circumferential side surface of the cam cylinder 800, cam grooves 800d (a first cam portion) that the ball members 701 can contact are formed at three regions in the circumferential direction. The ball member 701 contacts the cam groove 800d to determine a position of the cam cylinder 800 in the optical axis direction with respect to the linear cylinder 700. Furthermore, cam grooves 800e that the cam pins 203 can contact are formed at three regions in the circumferential direction on the cam cylinder 800. Similarly, a cam groove 800f that the cam pin 303 can contact, a cam groove 800g that the cam pin 405 can contact, and a cam groove 800h that the cam pin 603 can contact are formed on the cam cylinder 800. Additionally, a cam groove 800i (a second cam portion) that has the same trajectory as the cam groove 800d corresponding to the pin member 702 is formed on the cam cylinder 800, and an end spherical R portion of the pin member 702 contacts a cam bottom surface of the cam groove 800i. The pin member 702 engages with the cam groove 800i in the radial direction of the cam cylinder 800, and also contacts the cam groove 800i in two directions different from each other that are the optical axis direction. The cam groove 800d is provided at one end side in the optical axis direction of the cam cylinder 800, and on the other hand the cam groove 800i is provided at the other end side in the optical axis direction of the cam cylinder 800.

A gear portion 800j is provided at the outer circumferential side of the cam cylinder 800. A hole portion 800k that integrates the cam pins 303 and 405 and a hole portion 800l that integrates the cam pin 603 are also provided at the outer circumferential side. Furthermore, hole portions 800m that integrate the pin members 702 are provided at three regions in the circumferential direction. The cam cylinder 800 is, as illustrated in FIG. 6, provided with bottom surface portions 800n and 800o that receive an external pressure described below.

In FIG. 1, reference numeral 900 denotes a fifth unit. Reference numeral 901 denotes a fifth lens unit, and reference numeral 902 denotes a holding member that holds the fifth lens unit 901. The fifth lens unit 902 is provided with main guide holes 902a and 902b and a sub-guide portion 902c. Reference numeral 903 denotes a guide shaft member, which is fitted into the main guide holes 902a and 902b of the fifth lens unit 902. Reference numeral 904 denotes a guide shaft member, which is fitted into the sub-guide portion 902c of the fifth lens unit 902. The first unit 100, the second unit 200, the stop/shutter unit 300, the third unit 400, the fourth unit 600, and the fifth unit 900 described above constitute a plurality of optical element units.

Reference numeral 1000 denotes a base unit. Reference numeral 1001 denotes a base member, which is provided with hole portions 1001a and 1001b that hold the guide shaft members 903 and 904, respectively. It is also provided with rib portions 1001c and 1001d having the same trajectories as the cam grooves 800d and 800i respectively so as to be positioned differently from each other in the radial direction. The rib portion 1001c (at an internal diameter side) and the rib portion 1001d (at an outside diameter) are configured so as to face the bottom surface portion 800n and the bottom surface portion 800o of the cam cylinder 800 at a predetermined gap, respectively. The rib portions 1001c and 1001d are a third cam portion that contacts the cam cylinder 800 in the optical axis direction. Reference numeral 1002 denotes a gear member, which is rotatably driven by a driving source (not shown). Reference numeral 1003 denotes a CCD, which is attached to the base member 1001.

Next, a procedure of assembling the zoom lens barrel (a lens barrel unit) as configured above will be described. First of all, the stop/shutter unit 300, the third unit 400, and the fourth unit 600 are stacked to construct the integration unit to be integrated into the linear cylinder 700. The integration unit is in a state where the spring member 500 is hooked on the hook portion 305 of the stop/shutter unit 300 and the hook portion 404e of the third unit 400 (a state illustrated in FIGS. 3A and 3B). In this case, the shaft portion 306 is fitted into the positioning hole 602e to easily maintain the state of the integration unit as described above.

Figure 7A:
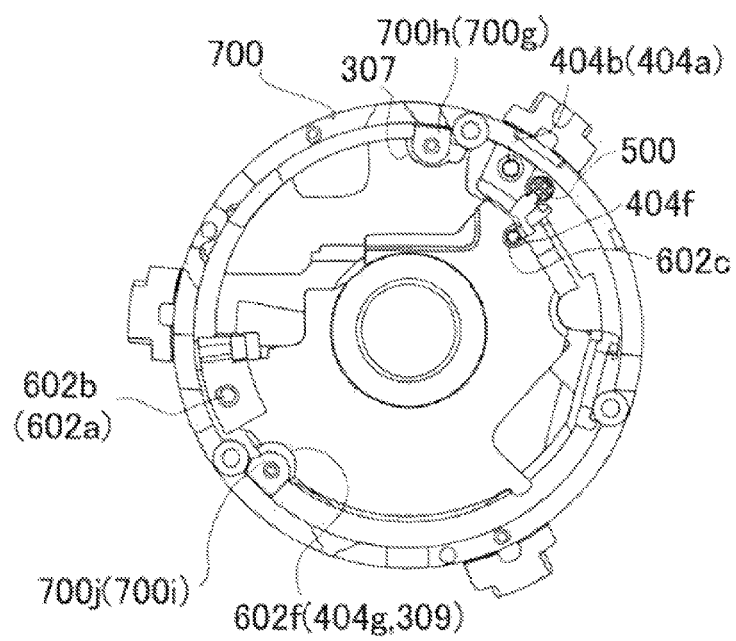
FIG. 7A is a view illustrating a procedure of integrating the integration unit into the linear cylinder.
Figure 7B:
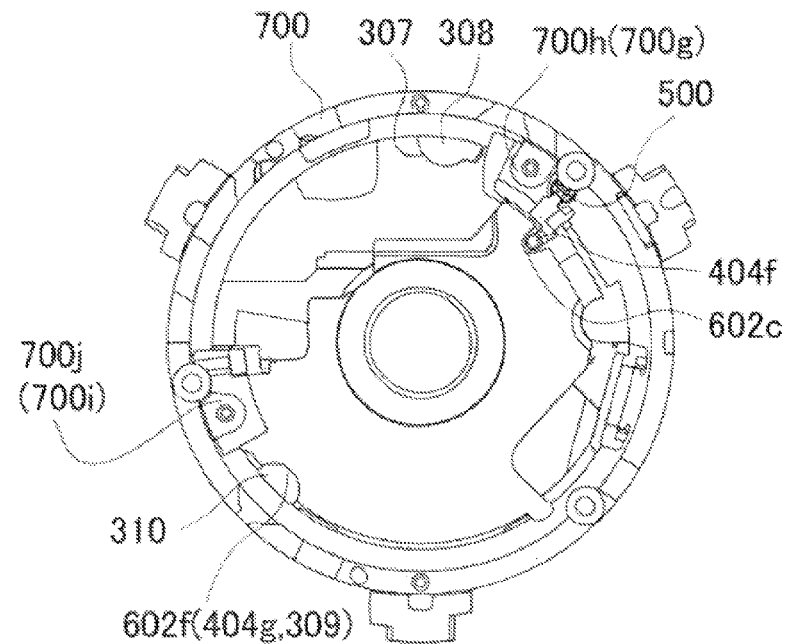
FIG. 7B is a view illustrating a procedure of integrating the integration unit into the linear cylinder.

FIGS. 7A and 7B are views of illustrating a procedure of integrating the integration unit (the unit configured by stacking the stop/shutter unit 300, the third unit 400, and the fourth unit 600) into the linear cylinder 700. When the integration unit is integrated into the linear cylinder 700, the notch portion 307 is aligned with the guide shaft holding portion (700g, 700h) in the optical axis direction. At the same time, the notch portions 309, 404g, and 602f are aligned with the guide shaft holding portion (700i, 700j) as illustrated in FIG. 7A (a first position). At the first position, the linear cylinder 700 is integrated into a position where the guide shaft holding portions 700g and 700i are adjacent to the convex-shaped portions 308 and 310 in the optical axis direction, respectively. Thus, the first optical element (the stop/shutter unit 300, the third unit 400) and the second optical element (the fourth unit 600) are integrated into the linear cylinder 700 at the first position. The stop/shutter unit 300 has the convex-shaped portions 308 and 310 that are overlapped with the guide shaft holding portions (700g, 700h) and (700i, 700j) at the first position respectively when viewed in the optical axis direction.

Subsequently, the integration unit (the first optical element and the second optical element) and the linear cylinder 700 are relatively rotated. In this case, the guide shaft holding portions 700g and 700h, the main guide holes 301a and 301b, and the main guide holes 404a and 404b coincide with each other in the optical axis direction. At the same time, the guide shaft holding portions 700i and 700j, the sub-guide portion 302, the sub-guide portion 404c, and the main guide holes 602a and 602b also coincide with each other in the optical axis direction as illustrated in FIG. 7B (a second position). At the second position, the guide shaft members 703 and 704 are integrated from sides of the guide shaft holding members 700h and 700j at the second position, respectively. Thus, at the second position that is relatively rotated around the optical axis with respect to the linear cylinder 700 from the first position, the integration unit is configured to be able to be supported by the guide shaft members 703 and 704. The guide shaft members 703 and 704 are fixed on the guide shaft holding portions 700g and 700h and the guide shaft holding portions 700i and 700j at the second position, respectively.

Figure 8A:
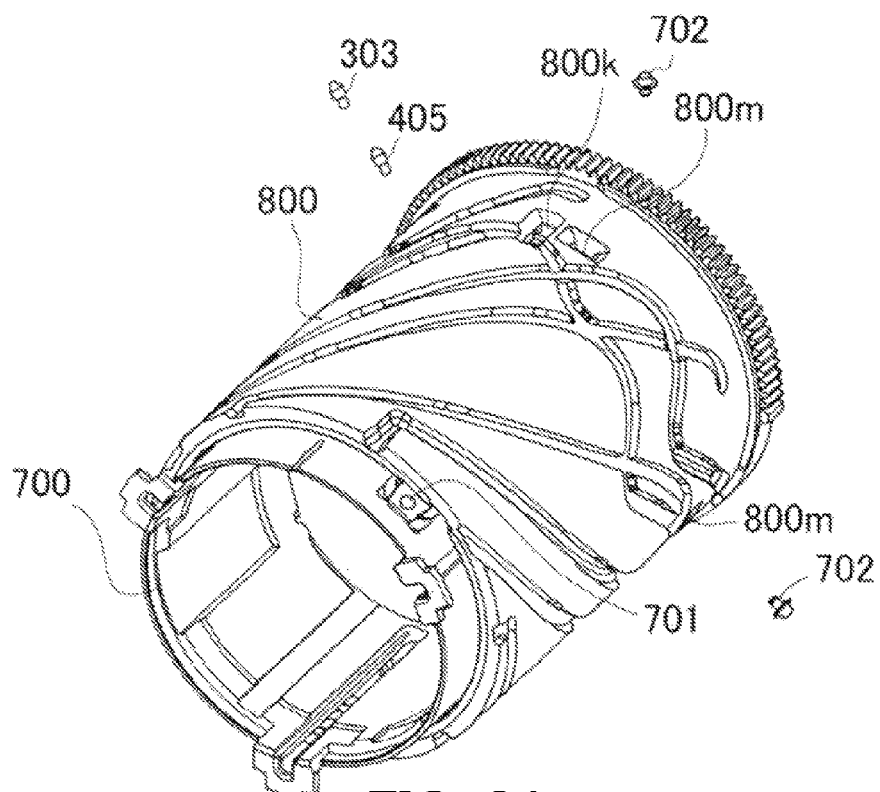
FIG. 8A is a perspective view illustrating a procedure of assembling the zoom lens barrel in the present embodiment.
Figure 8B:
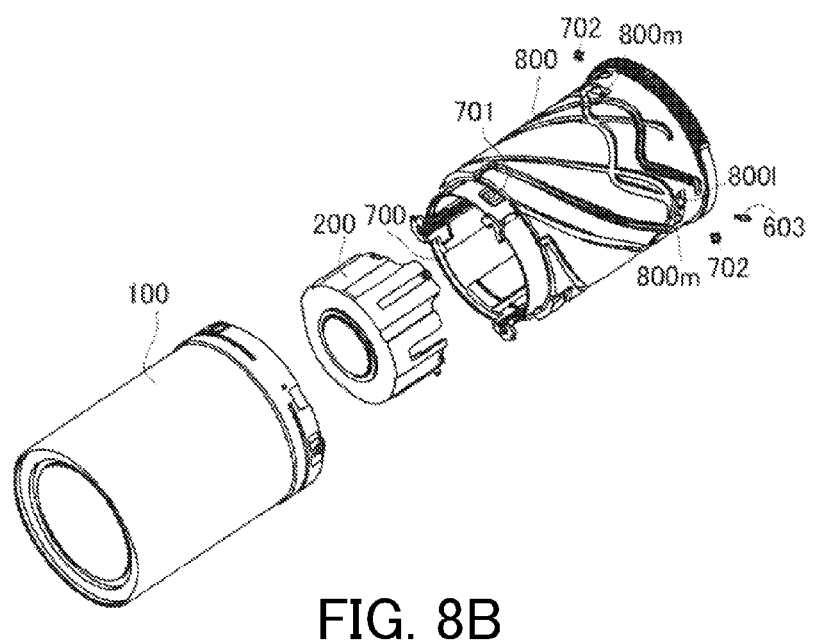
FIG. 8B is a perspective view illustrating a procedure of assembling the zoom lens barrel in the present embodiment.

FIGS. 8A and 8B are perspective views illustrating a procedure of assembling the zoom lens barrel. As illustrated in FIG. 8A, the linear cylinder 700 is fitted into the cam cylinder 800, and the cam pin 303 of the stop/shutter unit 300 is fitted into the hole portion 304 through integration hole portions 700k and 800k. Similarly, the cam pin 405 of the third unit 400 is fitted into the cam pin insertion hole 404d through the integration hole portions 700k and 800k. As illustrated in FIG. 8B, the cam pin 603 of the fourth unit 600 is fitted into the cam pin insertion hole 602d of the fourth lens unit holding member 602 through integration holes 700l and 800l. Next, the cam pin 203 of the second unit 200 is integrated so as to be aligned with an end of the cam groove 800d. Then, the pin member 702 is fitted into the hole portion 700e at a phase where the hole portion 800m and the hole portion 700e coincide with each other, and at the same time the ball member 701 is fitted into the hole portion 700c. In this state, the cam cylinder 800 is integrated and finally the first unit 100 is integrated. The integration as above is performed while the cam cylinder 800 is rotated at a predetermined phase.

Figure 9A:
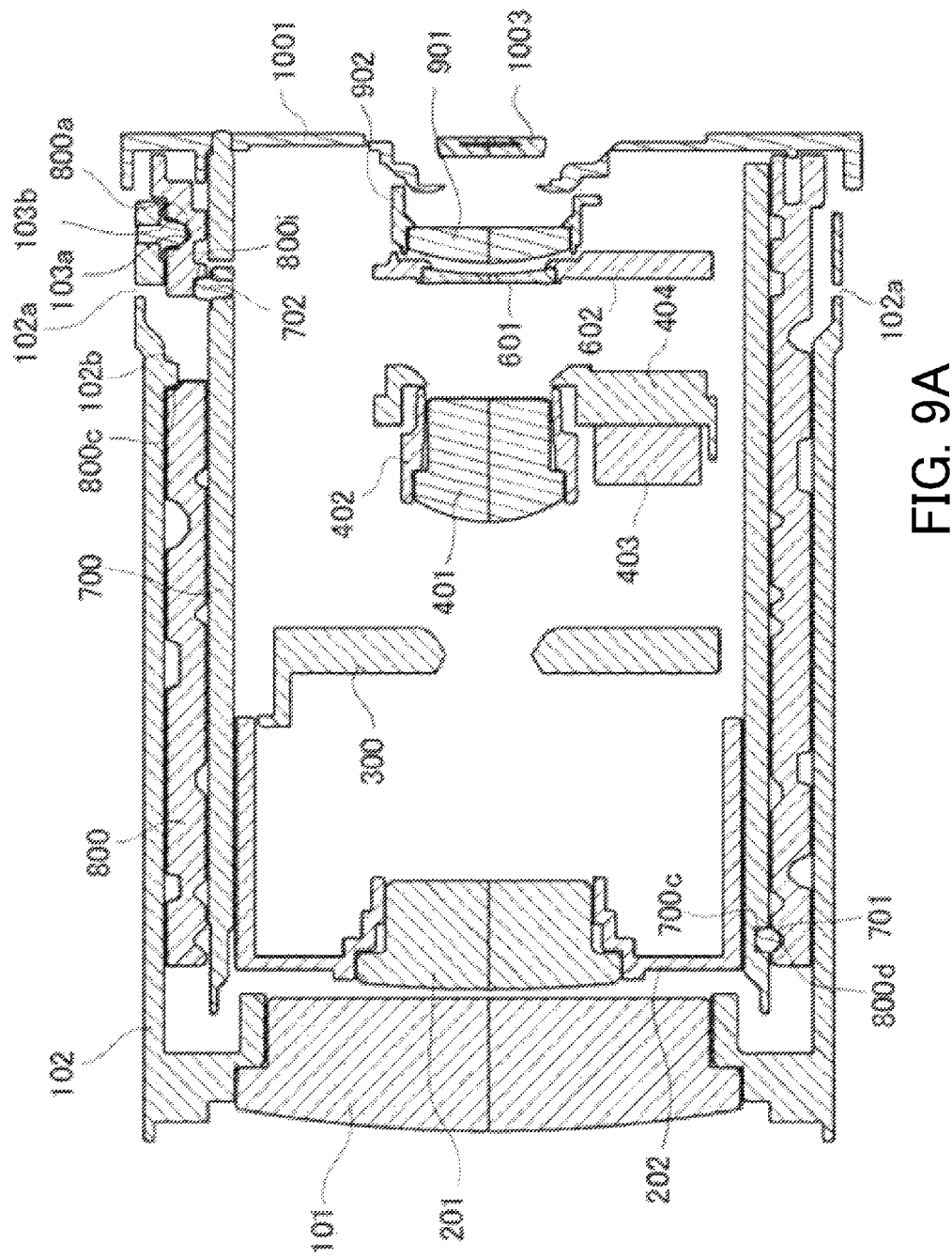
FIG. 9A is a cross-sectional view of the zoom lens barrel at a retracted position in the present embodiment.
Figure 9B:
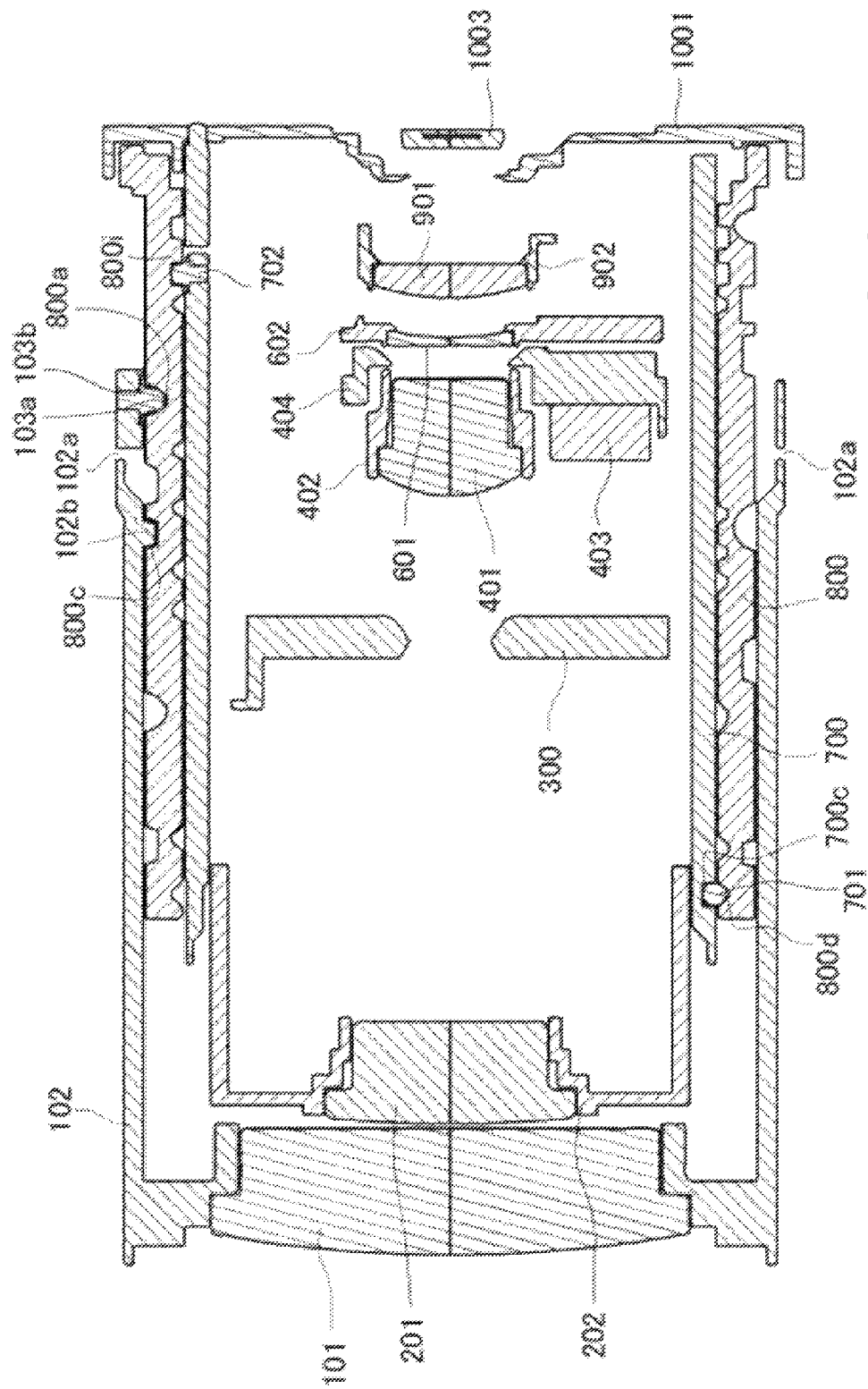
FIG. 9B is a cross-sectional view of the zoom lens barrel at a WIDE position in the present embodiment.
Figure 9C:
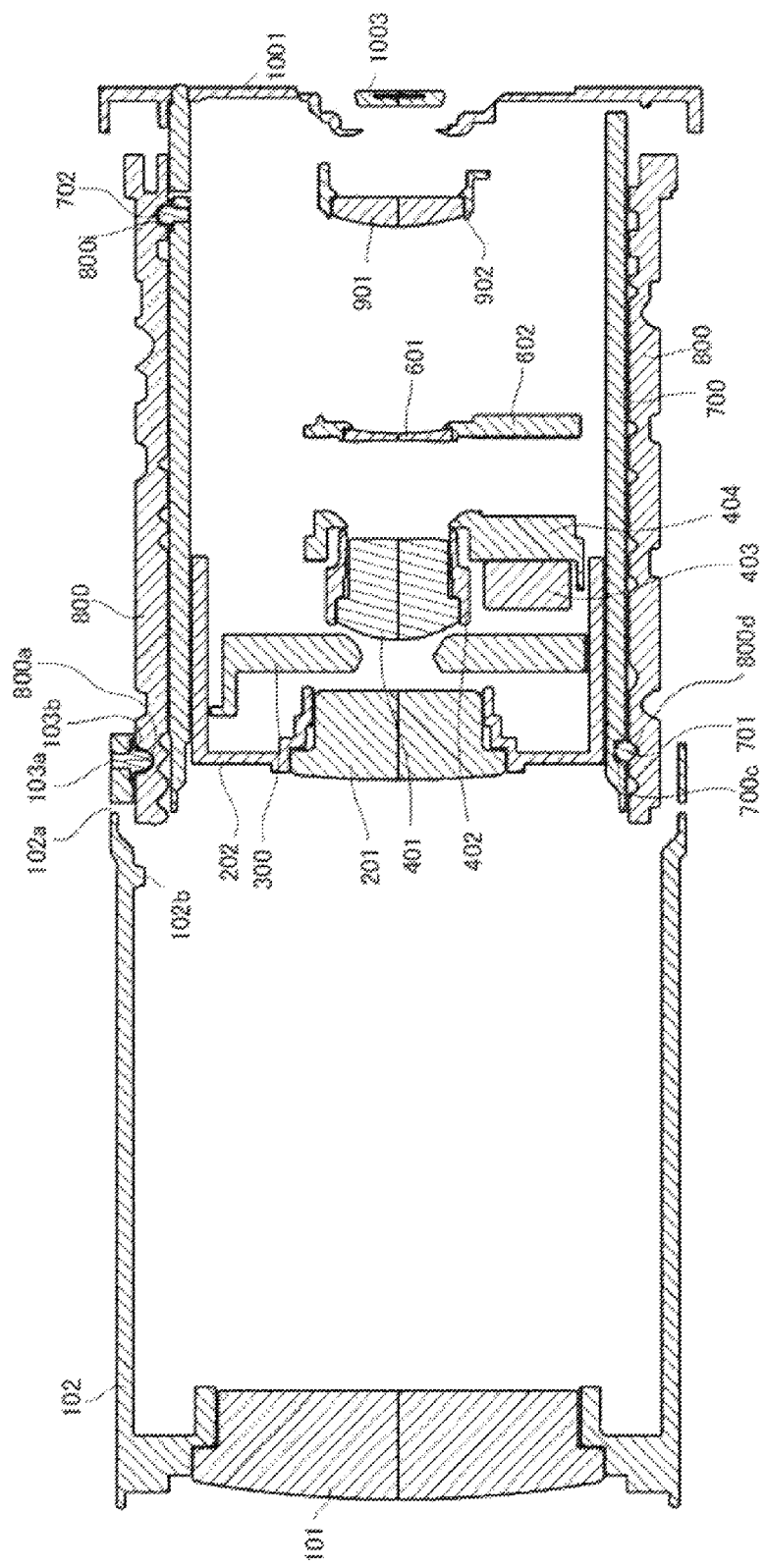
FIG. 9C is a cross-sectional view of the zoom lens barrel at a TELE position in the present embodiment.
Figure 10A:
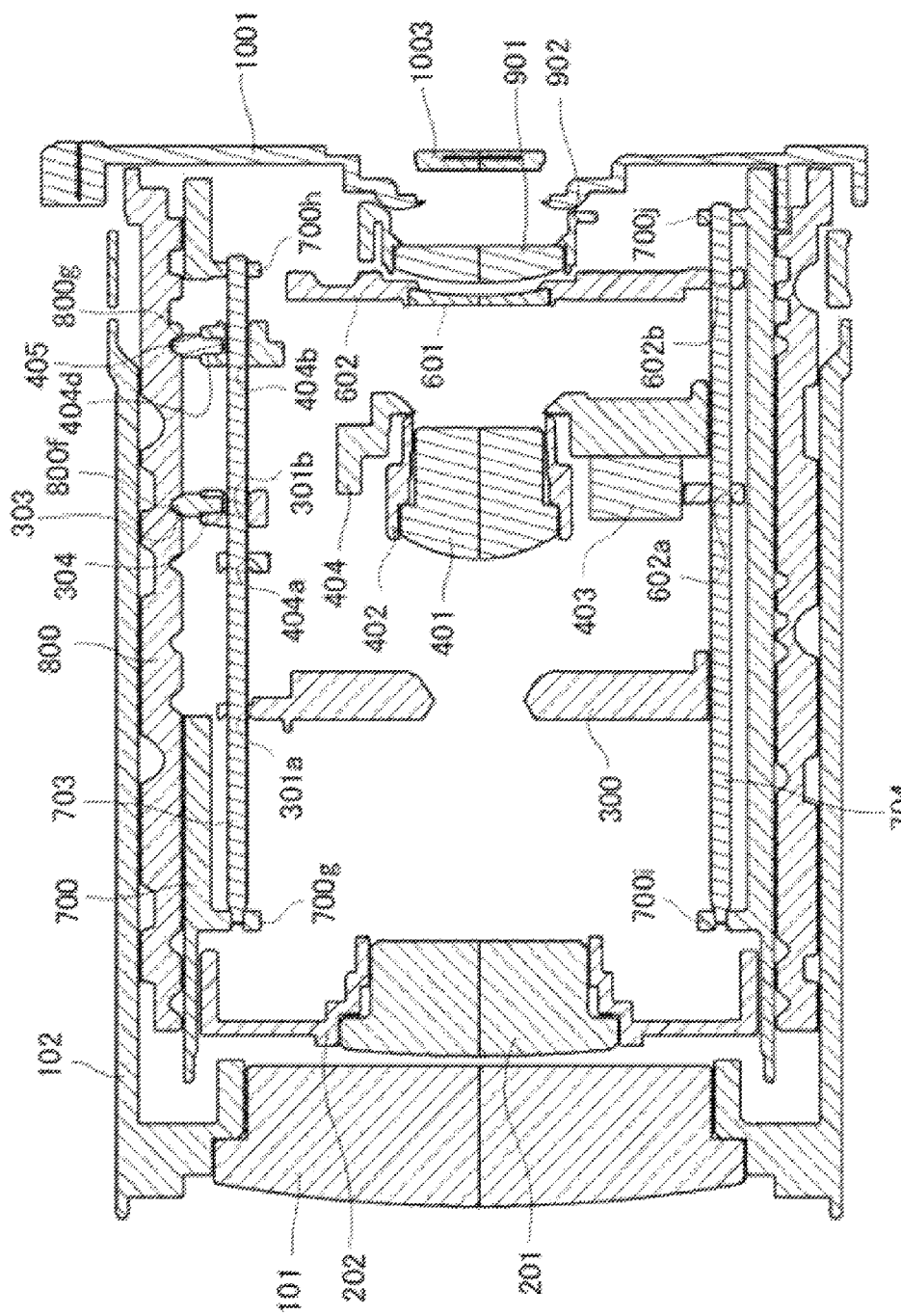
FIG. 10A is a cross-sectional view of the zoom lens barrel at a retracted position in the present embodiment.
Figure 10B:
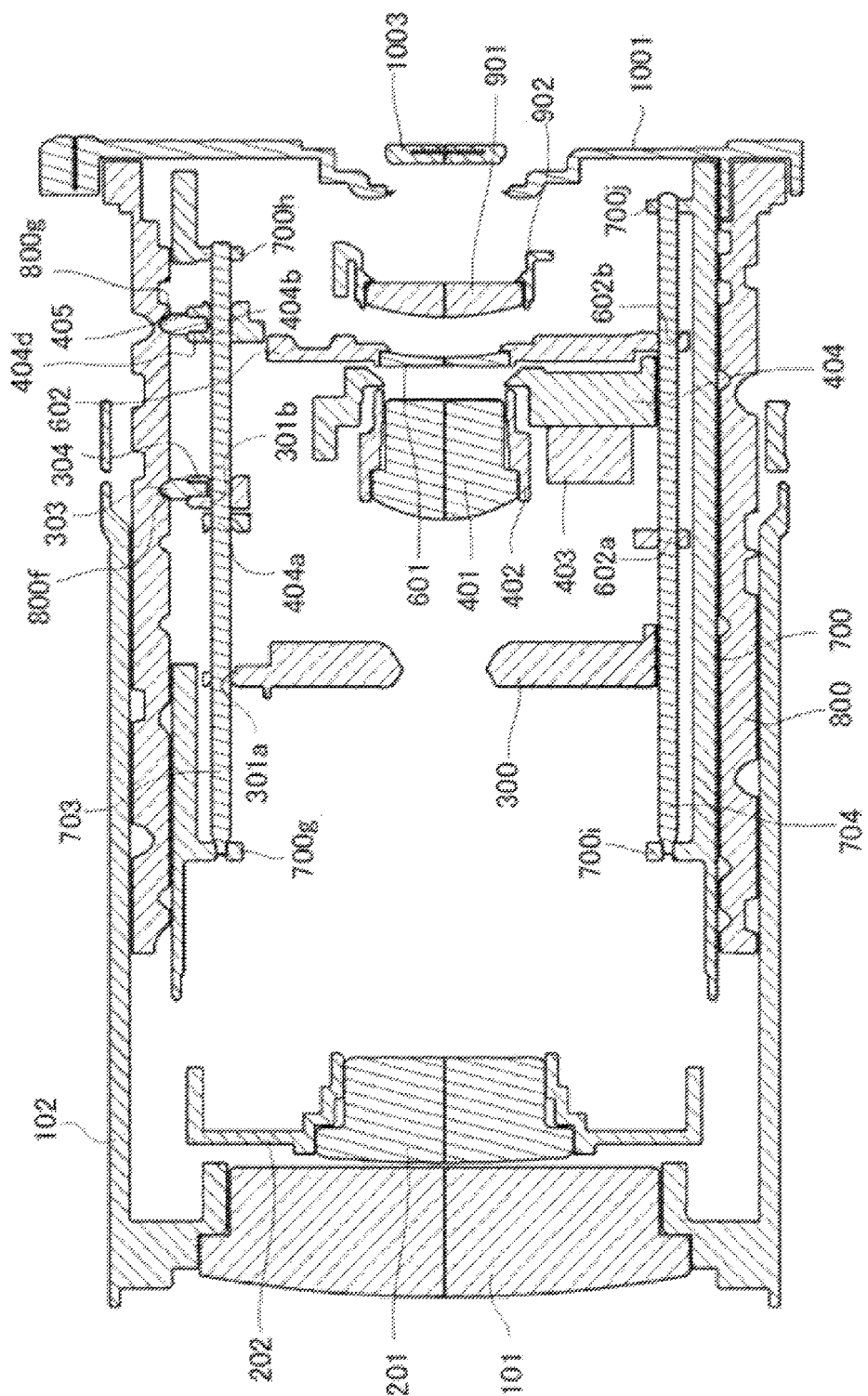
FIG. 10B is a cross-sectional view of the zoom lens barrel at a WIDE position in the present embodiment.
Figure 10C:
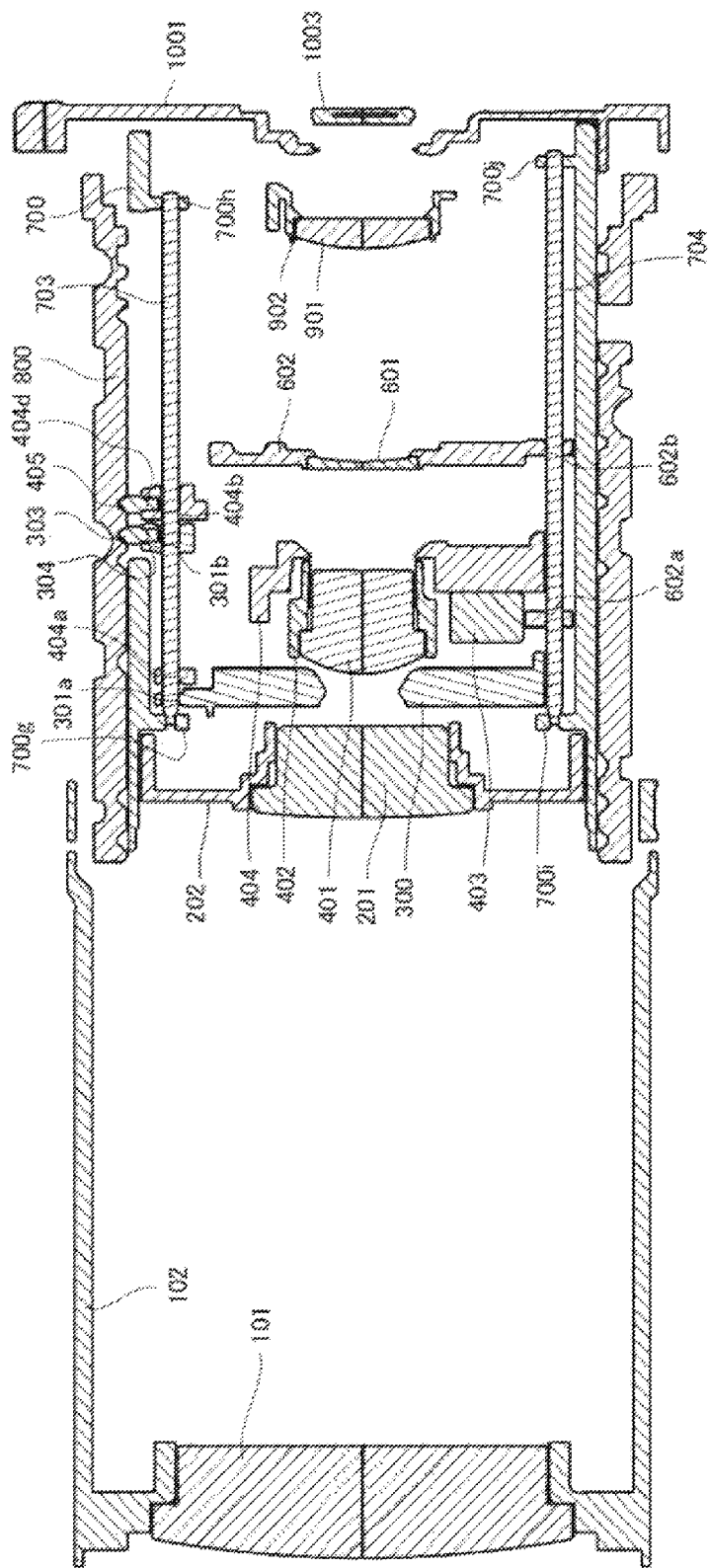
FIG. 10C is a cross-sectional view of the zoom lens barrel at a TELE position in the present embodiment.

Next, referring to FIGS. 9A to 9C and 10A to 10C, a zoom operation in the present embodiment will be described. FIGS. 9A to 9C and 10A to 10C are cross-sectional views of the zoom lens barrel in the present embodiment, and FIGS. 9A to 9C illustrate cut surfaces different from those of FIGS. 10A to 10c. FIGS. 9A and 10A are cross-sectional views at a retracted position, FIGS. 9B and 10B are cross-sectional views at a WIDE position, and FIGS. 9C and 10C are cross-sectional views at a TELE position. When a gear portion 1002 is rotated by a driving source (not shown), the rotating force is transmitted to the gear portion 800j to rotate the cam cylinder 800. Since the ball member 701 that is fitted into the linear cylinder 700 contacts the cam groove 800d, the cam cylinder 800 rotates to move in the optical axis direction along a cam trajectory of the cam groove 800d. One ball member 701 is configured so as to be movable in the outer circumferential direction by the notch portion 700d, and therefore the ball member 701 always contacts the cam groove 800d.

Figure 11:
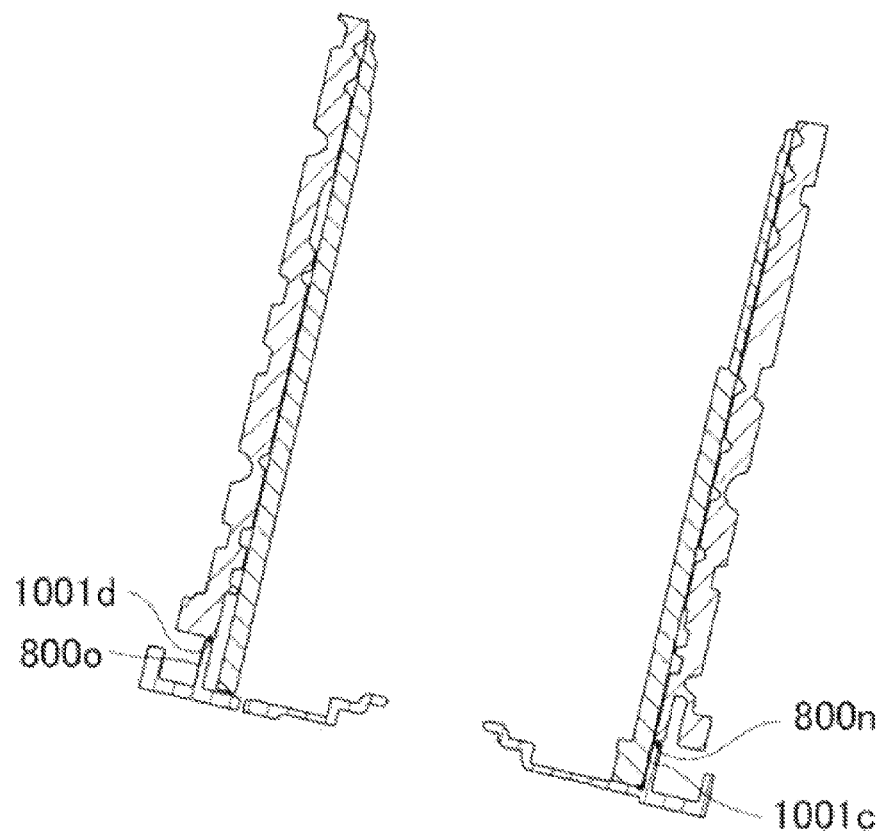
FIG. 11 is a cross-sectional view illustrating a relation between the cam cylinder and a base member in the present embodiment.

In the development view of the inner circumference of FIG. 5B, in a range A, two pin members 702 can engage with the cam groove 800i in both directions of the optical axis direction and the other pin member 702 can engage with the cam groove 800i only in a Z(−) direction. In a range B, the three pin members 702 can engage with the cam groove 800i in both directions of the optical axis direction. In a range C, the three pin members 702 can engage with the cam groove 800*i* only in a Z(+) direction. In a range D, as illustrated in FIG. 11, the rib portions 1001*c* and 1001*d* of the base member 1001 and the bottom surface portions 800*n* and 800*o* of the cam cylinder 800 are receivers of an external pressure in the Z(−) direction.

In the range C, the convex portion 700*a* of the linear cylinder 700 is a receiver of the external pressure in the Z (+) direction. The end spherical R portion of the pin member 702 contacts the bottom portion of the cam groove 800*i* in the overall range. One ball member 701 and the pin member 702 are configured to be movable in the radial direction by the notch portions 700*d* and 700*f*. The spherical R-shaped portion 103*a* of the cam pin 103 contacts the cam groove 800*a* to move in the optical axis direction along the cam trajectory of the cam groove 800*a* in accordance with the rotation of the cam cylinder 800. In this case, the groove portion 102*c* of the first unit cylinder 102 engages with the convex portion 700*a*, and the first unit 100 linearly moves in the optical axis direction. The cam pin 203 contacts the cam groove 800*e*, and the second unit 200 moves in the optical axis direction along the cam trajectory of the cam groove 800*e*. In this case, the cylinder portion 203*b* of the second cylinder 202 engages with the groove portion 700*b*, and the second unit 200 linearly moves in the optical axis direction. The cam pin 303 contacts the cam groove 800*f*, and the stop/shutter unit 300 moves in the optical axis direction along the cam trajectory of the cam groove 800*f*. In this case, the main guide holes 301*a* and 301*b* of the stop/shutter unit 300 are fitted into the guide shaft member 703, the sub-guide portion 302 is fitted into the guide shaft member 704, and the stop/shutter unit 300 linearly moves in the optical axis direction.

The cam pin 405 contacts the cam groove 800*g* and the third unit 400 moves in the optical axis direction along the cam trajectory of the cam groove 800*g*. In this case, the main guide holes 404*a* and 404*b* of the third unit base member 404 are fitted into the guide shaft member 703, the sub-guide portion 404*c* is fitted into the guide shaft member 704, and the third unit 400 linearly moves in the optical axis direction. The cam pin 603 contacts the cam groove 800*h* and the fourth unit 600 moves in the optical axis direction along the cam trajectory of the cam groove 800*h*. In this case, the main guide holes 602*a* and 602*b* of the fourth lens unit holding member 602 are fitted into the guide shaft member 704, the sub-guide portion 602*c* is fitted into the guide portion 404*f*, and the fourth unit 600 linearly moves in the optical axis direction. The rotation of the fifth unit 900 is limited by the guide shaft members 903 and 904, and the fifth unit 900 is driven to a predetermined position in the optical axis direction by a driving source (not shown). As described above, the first unit 100, the second unit 200, the stop/shutter unit 300, the third unit 400, the fourth unit 600, and the fifth unit 900 move in the optical axis direction.

As described above, the integration unit is configured by stacking the stop/shutter unit 300, the third unit 400, and the fourth unit 600, and then the integration unit is integrated from the opening portion that has an opening in the optical axis direction of the linear cylinder 700. The stop/shutter unit 300 and the third unit 400 are supported by the guide member 703 that is supported by the support portions 700*g* and 700*h* of the linear cylinder 700 so as to be linearly movable in the optical axis direction. The fourth unit 600 is supported so as to be linearly movable in the optical axis direction by the guide member 704 that is supported by the support portions 700*i* and 700*j* of the linear cylinder 700. Thus, the guide members 703 and 704 are supported by the support portions (700*g*, 700*h*) and (700*i*, 700*j*) of the linear cylinder 700. Therefore, the inclinations of the stop/shutter unit 300, the third unit 400, and the fourth unit 600 are suppressed and the optical performance can be improved.

The sub-guide portions 302 and 404*c* of the stop/shutter unit 300 and the third unit 400 are fitted into the guide member 704 to limit the rotation of the stop/shutter unit 300 and the third unit 400 around the optical axis. Therefore, the inclination of the guide member 704 in the optical axis direction is suppressed, and the sub-guide portions 302 and 404*c* are configured to be smoothly movable in the optical axis direction with respect to the guide member 704. In this case, it is not necessary to provide a member that is a replacement of the guide member 704 in another space. The sub-guide portion 602*c* of the fourth unit 600 is fitted into the guide portion 404*f* that is provided on the third unit base member 404 to limit the rotation of the fourth unit 600 around the optical axis. Therefore, it is not necessary to provide a member that is a replacement of the guide portion 404*f* additionally, and the number of parts and the cost can be reduced. The convex-shaped portions 308 and 310 of the stop/shutter unit 300 can prevent the intrusion of the harmful light in the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-184054, filed on Aug. 19, 2010, which is hereby incorporated by reference herein in its entirety.

What is claimed is:

1. A zoom lens barrel comprising:
   a first optical element;
   a second optical element;
   a first guide member configured to linearly guide the first optical element in an optical axis direction;
   a second guide member configured to linearly guide the second optical element in the optical axis direction; and
   a linear cylinder including an opening portion configured to be able to integrate the first optical element and the second optical element in the optical axis direction, a first holding portion that supports both ends of the first guide member, and a second holding portion that supports both ends of the second guide member.

2. The zoom lens barrel according to claim 1,
   wherein the first optical element and the second optical element are configured to be integrated into the linear cylinder at a first position, and configured such that the first guide member and the second guide member are fitted to the first optical element and the second optical element respectively at a second position that is relatively rotated around the optical axis from the first position with respect to the linear cylinder, and
   wherein the first guide member and the second guide member are fixed on the first holding portion and the second holding portion respectively at the second position.

3. The zoom lens barrel according to claim 2,
   wherein the first optical element includes a convex-shaped portion that is overlapped with the first holding portion and the second holding portion at the first position when viewed in the optical axis direction.

4. The zoom lens barrel according to claim 1,
   wherein a rotation of the first optical element around the optical axis is limited by the second guide member.

5. The zoom lens barrel according to claim 1,
wherein a rotation of the second optical element around the optical axis is limited by a guide member provided in the first optical element.

\* \* \* \* \*